No. 630,506. Patented Aug. 8, 1899.
H. HIRZEL.
APPARATUS FOR AERATING LIQUIDS.
(Application filed Aug. 16, 1897.)
(No Model.) 2 Sheets—Sheet 1.
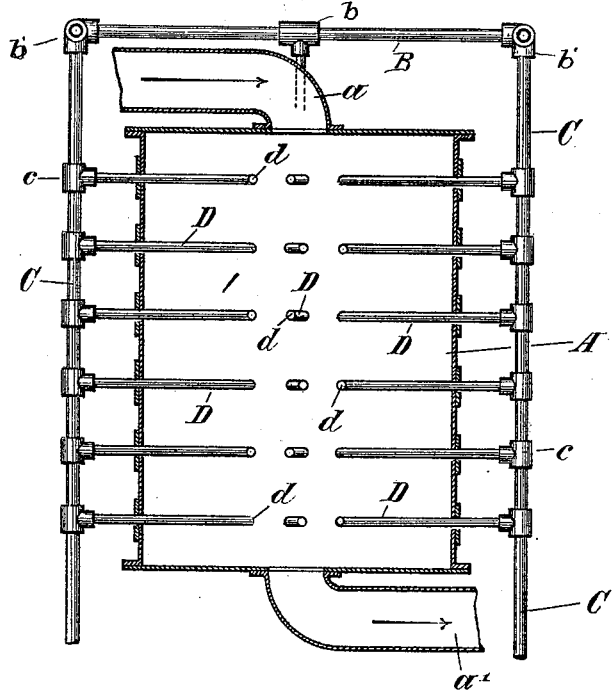
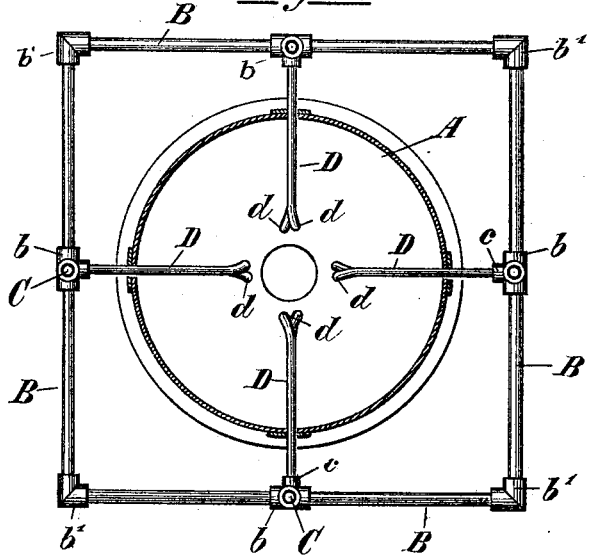
Witnesses.
SC. Iloetzner
N. Mitchell
Inventor.
Heinrich Hirzel
by Max Georgii
Attorney.

No. 630,506. Patented Aug. 8, 1899.
H. HIRZEL.
APPARATUS FOR AERATING LIQUIDS.
(Application filed Aug. 16, 1897.)
(No Model.) 2 Sheets—Sheet 2.
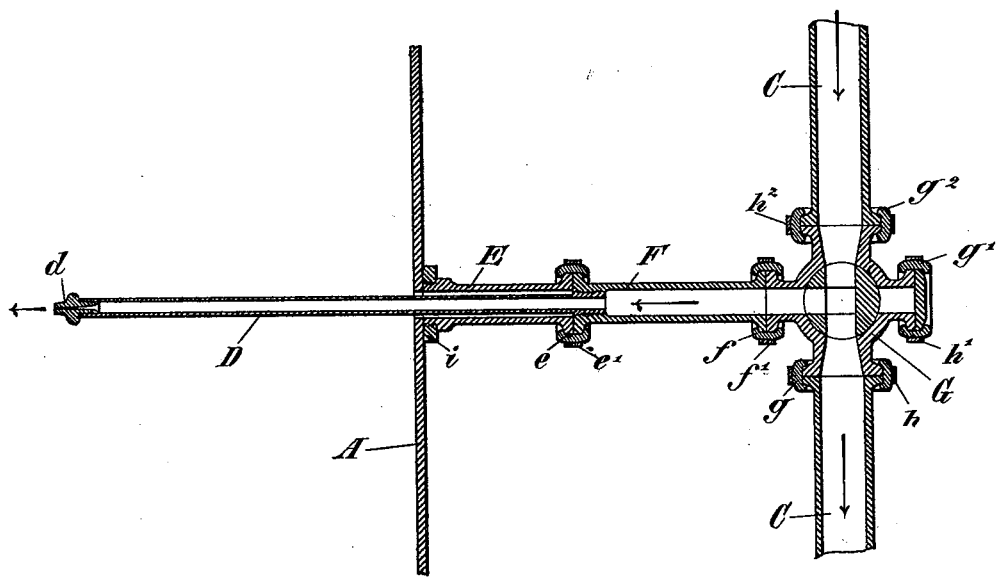
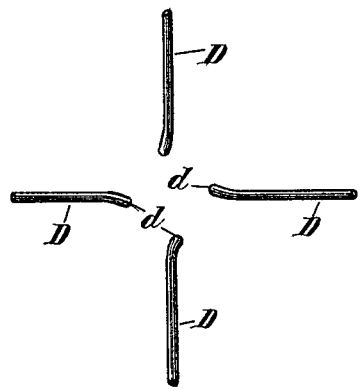 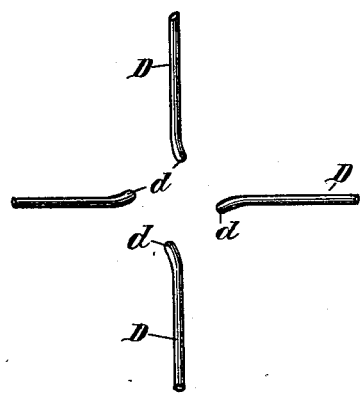
Witnesses.
R. Gloetzner.
O. Mitchell
Inventor.
Heinrich Hirzel
by Max Georgii
Attorney.

UNITED STATES PATENT OFFICE.

HEINRICH HIRZEL, OF LEIPSIC-PLAGWITZ, GERMANY.

APPARATUS FOR AERATING LIQUIDS.

SPECIFICATION forming part of Letters Patent No. 630,506, dated August 8, 1899.

Application filed August 16, 1897. Serial No. 648,415. (No model.)

*To all whom it may concern:*

Be it known that I, HEINRICH HIRZEL, a citizen of the Empire of Germany, residing at Leipsic-Plagwitz, in the Kingdom of Saxony, Germany, have invented certain new and useful Improvements in Apparatus for Aerating Liquids; and I do hereby declare the following to be a full, clear, and exact description of the invention, such as will enable others skilled in the art to which it appertains to make and use the same.

This invention has for its object an apparatus for absorbing gases in liquids, the gases being conveyed with the least possible speed through a large vessel into which the liquid is injected in the finest separated or atomized condition by means of a number of nozzles arranged over one another, the gases, together with the liquid injected through the nozzles, being set in motion in such a way that an opposite direction of rotation is obtained for each set of nozzles alternately. The gases on their passage through the absorption vessel are thus brought into the most thorough admixture with the injected liquid. The alternate right and left rotary movement of the sprayed liquid is obtained by arranging the nozzle ends of each series of nozzles in such a way that one ejected sprayed jet of liquid encounters almost at right angles the jet from the next nozzle. A thorough contact between the sprayed rotating liquid and the gases rising or descending vertically is thus obtained. Each nozzle may also be arranged fixed or easily and separately removable from the apparatus or may be made adjustable.

This improved absorption apparatus is shown in the accompanying drawings in Figures 1 and 2 in vertical and horizontal sections, respectively, with the nozzles arranged fixed. Fig. 3 shows an enlarged sectional view of an arrangement in which the nozzles are conveniently removable. Figs. 4 and 5 are detail views showing the construction of the discharge ends of two sets of nozzles to be arranged over one another.

The absorption apparatus shown in Figs. 1 and 2 consists of a vessel A, into which the gases enter at the top through pipe $a$ and pass with a slow movement downward and out through pipe $a'$, or they may, if desired, be conveyed through the vessel in a reverse direction. There are arranged in the vessel, for instance, six sets of nozzles, each set having four nozzles D. The ends $d$ of the nozzles of each set have alternately a different tangential end direction, in such a way that the liquid flowing through each set is caused to rotate alternately in an opposite direction. To carry my invention into effect, the said nozzles are arranged to discharge or inject the liquid into the path of the gases at diametrically opposite points thereof and from at least four sides, as shown, and said nozzles are also arranged substantially concentric with the inlet and outlet openings for the gases.

In the form of construction shown in Figs. 1 and 2 it is assumed that the pipes B and C for supplying liquid are connected by means of cross and elbow pieces $b\ b'$ and $c$ with the nozzle-pipes D. In this arrangement the insertion or withdrawal of any single nozzle is somewhat inconvenient. In order to facilitate this operation of insertion and withdrawal an arrangement of nozzle is shown in Fig. 3 in which instead of cross or elbow pieces $b\ b'\ c$ a three-way tap G is employed, which is connected by means of flanges $f\ g\ g'\ g^2$ in two parts and wrought-iron rings $f'\ h\ h'\ h^2$ with supply-pipes C and F, respectively, for the liquid, in such a way as to be easily releasable.

The nozzle-pipe D is screwed into a short piece of tube E, which again may be connected by means of flanged pieces $e$, in two parts, and a wrought-iron ring $e'$, with the tube F, mounted on the apparatus, but in such a way as to be easily removable. The tube F is screwed into a wrought-iron ring $i$, laid around it on the vessel A. If the tap G be closed against the pipe F, then after the intermediate pipe F, with the nozzle-pipe D, has been drawn out the respective nozzle D can be set out of action during the working of the apparatus, while the other nozzles continue to work. In this manner any desired nozzle of the apparatus may be set in action or put out of action, as desired.

Any suitable number of nozzles for each set of nozzles and also any suitable number of sets of nozzles may of course be employed for the absorption apparatus.

The construction of the nozzle ends $d$ is such that the sprayed or atomized jet of each nozzle strikes or flows into the jet of the next adjacent nozzle to the right or left, cutting the same, preferably, at right angles and diverting the same from its radial direction. The result of this is a movement of the liquid in a circular path or direction. As the direction of the nozzle ends is reversed in each alternate set, the direction of movement of the liquid from each set of nozzles is reverse to that of adjacent sets, and thereby an uncommonly thorough admixture of gases and liquids is obtained.

Having now particularly described and ascertained the nature of my said invention and in what manner the same is to be performed, I declare that what I claim is—

1. An apparatus for the purpose described, the same comprising a suitable vessel having an inlet and an outlet for gases, arranged in line with each other, and a set or series of stationary nozzles located in the path of the gases at diametrically opposite points, said nozzles being arranged to inject a liquid into the gases in tangential directions.

2. An apparatus for the purpose described, the same comprising a suitable vessel having an inlet and an outlet for gases, arranged in line with each other, and a set or series of stationary nozzles located at diametrically opposite points in the path of the gases, and substantially concentric with said inlet and outlet, the said nozzles being arranged to inject a liquid into the gases in tangential directions.

3. An apparatus for the purpose described, the same comprising a suitable vessel having an inlet and an outlet for gases, and a number of sets or series of spray-nozzles for a liquid arranged one above the other in the path of the gases intermediate the inlet and the outlet therefor, the nozzles of each set discharging in different directions.

4. An apparatus for the purpose described, the same comprising an inlet and an outlet for gases, a number of sets or series of spray-nozzles for a liquid, arranged one above the other and discharging in the path of the gases in the vessel, and means for reversing the direction of discharge of any one or more of said nozzles.

5. An apparatus for the purpose described, the same comprising an inlet and an outlet for gases, a set or series of stationary nozzles having curved inner ends and arranged to inject a liquid into the path of the gases, and projecting beyond the sides of the vessel, a tube E, surrounding the projecting portion of each nozzle, a tube F, detachably connected to each tube E, and a liquid-supply pipe detachably connecting the tubes F and provided with a controlling-cock at the point of connection with each of said tubes.

In testimony whereof I affix my signature in presence of two witnesses.

HEINRICH HIRZEL.

Witnesses:
 RUDOLPH FRICKE,
 OTTO DOEDERLEIN.